May 18, 1954  H. W. BOTELER  2,678,662
FLUID PRESSURE ACTUATOR

Filed Aug. 24, 1950  4 Sheets-Sheet 1

INVENTOR.
Henry W. Boteler
BY
ATTORNEY

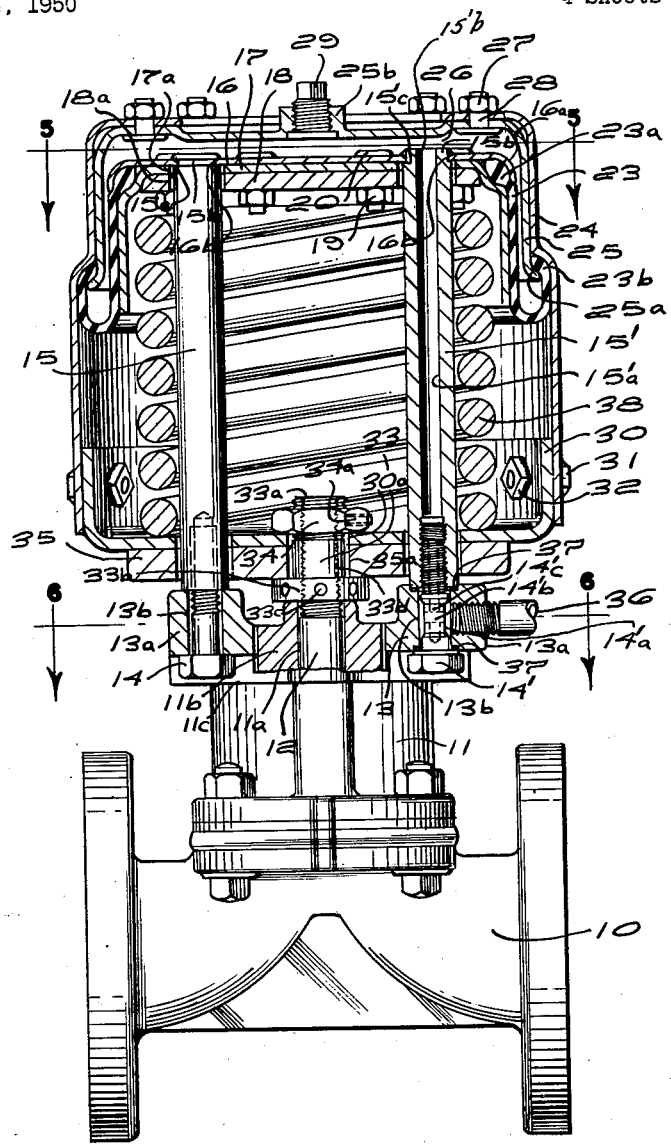

May 18, 1954   H. W. BOTELER   2,678,662
FLUID PRESSURE ACTUATOR

Filed Aug. 24, 1950   4 Sheets-Sheet 4

INVENTOR.
Henry W. Boteler
BY
ATTORNEY

Patented May 18, 1954

2,678,662

UNITED STATES PATENT OFFICE 2,678,662

FLUID PRESSURE ACTUATOR

Henry W. Boteler, East Greenwich, R. I., assignor to Grinnell Corporation, Providence, R. I., a corporation of Delaware Application August 24, 1950, Serial No. 181,241

1 Claim. (Cl. 137—788)

This invention relates to improvements in fluid pressure actuators. More especially it has to do with actuators of the type disclosed in the Fitch Patent No. 2,478,575 of August 9, 1949.

The actuator of the Fitch patent has many desirable characteristics. It has an over-all diametrical dimension only a little larger than the diameter of the area on which the fluid pressure is effective. It has no packing glands or stuffing boxes to prevent the leakage of pressure around its moving parts, hence it can be operated with a minimum of friction loss. It is compact, easy to assemble and disassemble and is highly efficient. However, the actuator of the Fitch patent is so organized that if the cover plate is attached directly to a valve bonnet and the push rod is moved by the spring to open the valve, then the fluid pressure would be effective only to keep the valve closed. Hence if some mishap were to cause the fluid pressure to fail the actuator of the Fitch patent would open the valve and hold it open until the fluid pressure is restored.

It is an object of the present invention to provide an actuator having the aforesaid desirable characteristics of the Fitch actuator and in addition having the feature of acting under a fluid pressure to open the valve to which it is operatively connected. This is particularly desirable in the case of a valve which should be promptly closed if any unforeseen event occurs which causes the actuating pressure to become ineffective.

Another object of the present invention is to provide, in a fluid pressure actuator of my improved type, means for connecting the fluid pressure system through a fixed inside piston unit to a chamber between said piston element and an outside cylinder unit which moves with respect thereto thus avoiding the need for a flexible hose connection.

The best mode in which it has been contemplated applying the principles of my improvements is shown in the accompanying drawings but these are to be deemed primarily illustrative because it is intended that the patent shall cover by suitable expression in the appended claim whatever features of patentable novelty reside in the invention disclosed.

In the drawings:

Fig. 3 is an elevation in medial section through the actuator illustrating the positions of its moving parts when no fluid pressure is being applied, the diaphragm valve being closed;

Figure 5:
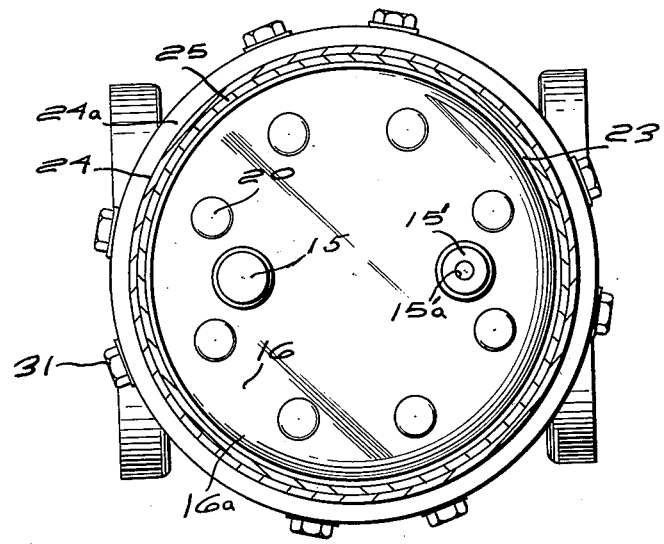
Figure 6:
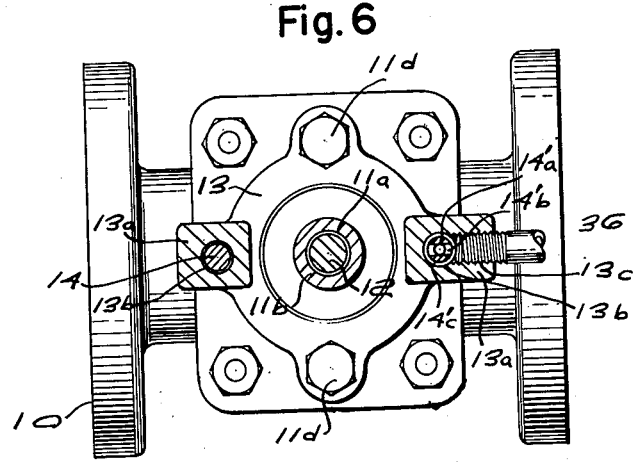

Figs. 5 and 6 are cross-sectional views taken as on lines 5—5 and 6—6 respectively of Fig. 3.

Referring now more particularly to the drawings, the improved actuator is secured to the bonnet 11 of a diaphragm valve 10 such as is shown in Letters Patent No. 2,412,105 of December 3, 1946. This valve, however, is primarily illustrative of any device having parts which it is desired to be moved by an actuator. Specifically, the valve here shown is a "Grinnell-Saunders diaphragm valve" the moving parts of which are not shown with the exception of the valve stem 12. This stem extends through a hole 11a in the bonnet 11 and connects the other moving parts (not shown) of the valve 10 to the moving parts of the actuator.

Figures 1, 2:
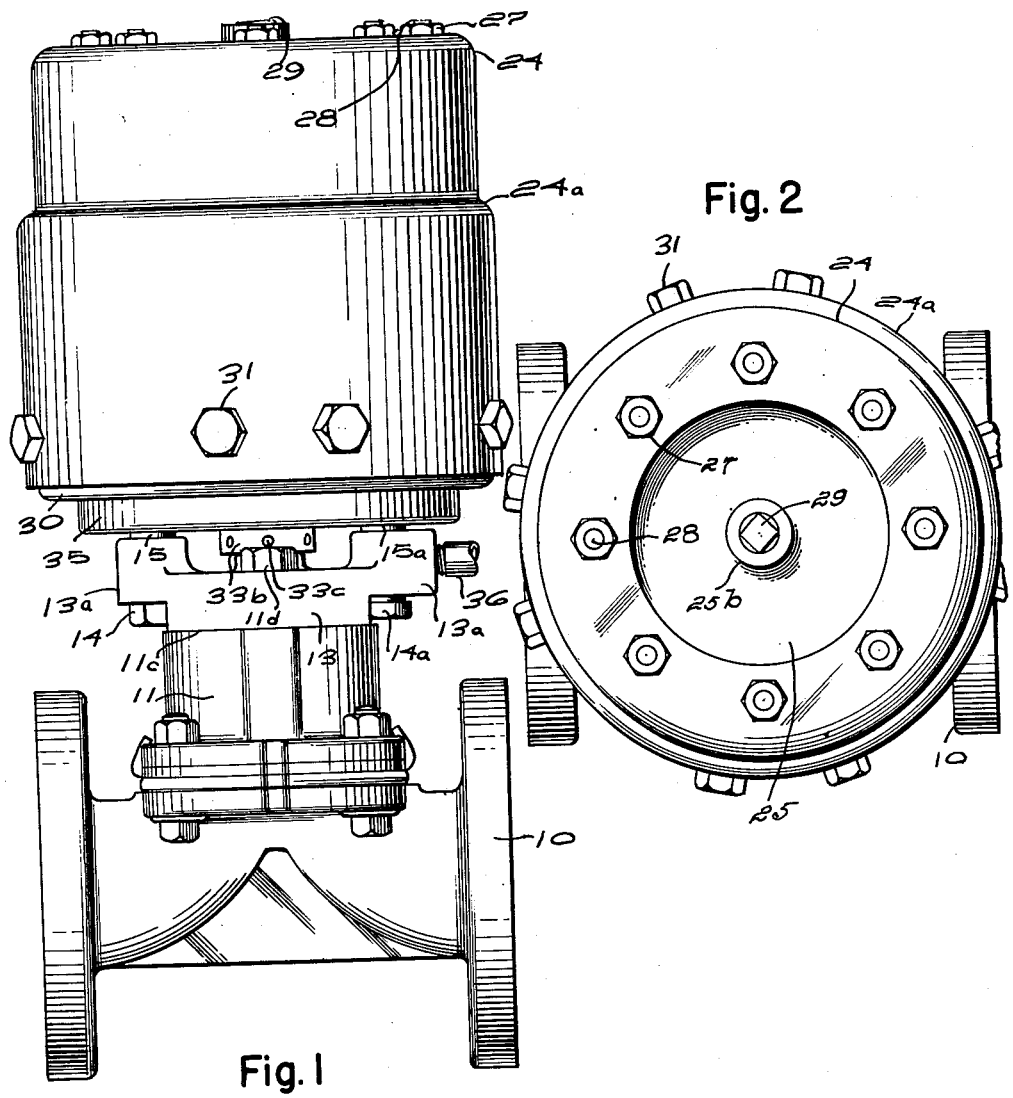
Fig. 1 is an elevation of an actuator embodying my improvements, showing it applied to a diaphragm valve.
Fig. 2 is a plan view of the actuator and valve shown in Fig. 1.
Figure 4:
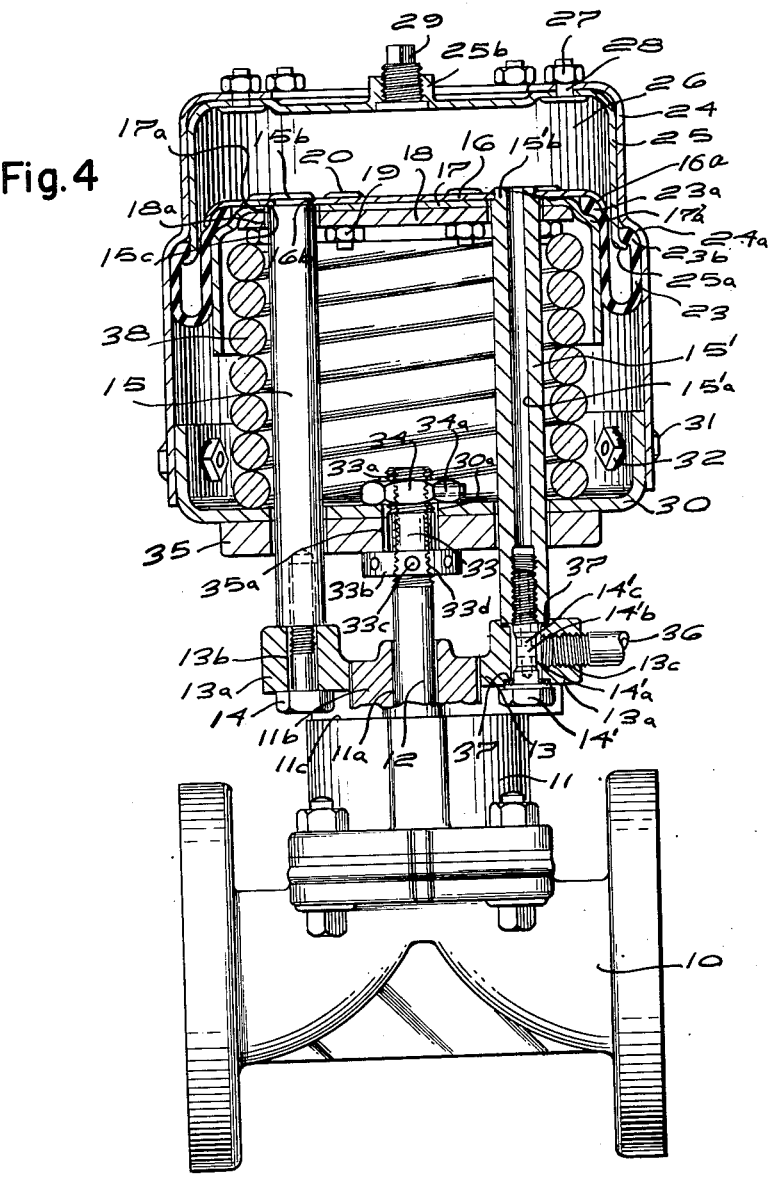
Fig. 4 is the same view as shown in Fig. 3 except that the moving parts are in the positions they assume when fluid pressure is applied and the diaphragm valve is open.

For the purpose of this specification wherever the words "upper" and "lower" are used they shall refer to the relative vertical positions of the parts, assuming the device to be in the upright position shown in Figs. 1, 3 and 4 of the drawings. Likewise the words "inner" and "outer" wherever used, shall refer to the horizontal positions of the parts with respect to the axis of the generally cylindrical device.

The diameter of the upper portion of the generally cylindrical valve bonnet 11 is reduced at 11b and the shoulder 11c resulting from this reduction in diameter provides an annular seat for a suitably shaped adapter collar 13 to which the actuator is secured. This adapter collar fits over the reduced upper portion 11b of the valve bonnet 11 and is fastened thereto by studs 11d.

The adapter collar 13 is provided with suitable projections 13a on its circumference, which have holes 13b centrally located therein with their axes parallel to the axis of the valve stem 12. Studs 14 and 14' inserted in the holes 13b are screwed into the lower ends of columns 15 and 15', thus securely fastening these columns to the adapter collar 13.

The fixed piston unit comprises a seal plate 16, a seal cup 17 and a reinforcing plate 18. These parts of the fixed piston unit are fastened together by a plurality of nuts 19 and bolts 20 the heads of latter being seal welded to the seal plate 16 to prevent them from turning when the nuts 19 are tightened against the reinforcing plate 18 and to prevent leakage of pressure around the said bolts. Suitable holes 17a and 18a in the seal cup 17 and the reinforcing plate 18, respectively, accommodate the upper ends of the columns 15 and 15' which are fastened to the fixed piston unit at the seal plate 16 preferably by welding.

As shown in the drawings the columns 15, 15' have their diameters reduced at their upper ends forming necks 15b, 15'b which extend through suitable holes 16b in the seal plate 16 and are welded to the said seal plate in such a manner that pressure cannot escape through the holes 16b. The rim of the holes 16b in the seal plate 16 rest on shoulders 15c, 15'c resulting from the reduction in the diameters of the columns, said shoulders supporting the seal plate 16 at those points and, together with the welds, securely fastening the columns to the fixed piston unit.

The seal plate 16 is formed with a rounded-over edge 16a located adjacent to a reversed curved portion 17b on the seal cup 17. The curves of these two adjacent portions create an annular pocket in which is clamped a circular bead 23a at the inner edge of a flexible sleeve diaphragm 23. This sleeve diaphragm extends downward from the bead 23a, turns on itself and then extends upward to another circular bead 23b at its outer edge. This second bead 23b is clamped in another annular pocket created by the reversed curves of suitably formed portions 24a and 25a. The portion 24a is formed in the generally cylindrical side wall of an outer casing 24, and the portion 25a is formed at the lower edge of the cylindrical side wall of a seal cup 25. Both the outer casing 24 and the seal cup 25 are parts of a movable cylinder unit.

The seal cup 25 of the said movable cylinder unit, the seal plate 16 of the fixed piston unit and the flexible sleeve diaphragm 23 define a pressure chamber 26.

The outer casing 24 and the seal cup 25 are fastened together by nuts 27 and bolts 28 the heads of which are welded to the seal cup 25 to prevent them from turning when the said nuts are tightened and to prevent leakage of pressure from the pressure chamber 26.

A suitable plug 29 is used to block up the hole 25b in the seal cup 25. This hole is the point on the device where fluid pressure would normally be admitted. In the present invention, however, if the fluid pressure were admitted at this hole a flexible hose or other flexible fluid pressure connection would be required, because hole 25b is located in one of the movable parts of the improved actuator. Accordingly, other methods have been devised for admitting the fluid pressure, avoiding the necessity of a flexible fluid pressure connection.

A flanged bottom plate 30 is secured to the lower end of the outer casing 24 by bolts 31 and nuts 32, the latter being welded to the flanges of the bottom plate 30 to prevent them from turning when the bolts 31 are tightened.

A hole 30a is centrally located in the plate 30 through which hole the stem 33a of an adjusting sleeve bushing 33 extends. The upper end of the bushing stem 33a is threaded externally to receive a lock nut 34, and the enlarged annular head 33b of this bushing has a series of radial holes 33c drilled about its circumference.

A reinforcing plate 35 with a centrally located hole 35a to accommodate the adjusting bushing 33 is interposed between the flanged bottom plate 30 and the head 33b. The lock nut 34 is turned down far enough on the stem 33a to hold the reinforcing plate 35 tightly enough against the flanged bottom plate 30 to prevent needless play while permitting the bushing to be turned when a suitable pin wrench is inserted in one of the radial holes 33c. The lock nut 34 is then locked in this position by a locking screw 34a.

The adjusting bushing 33 is also internally threaded to receive the threaded upper end of the valve stem 12. In this manner the element to be actuated is adjustably connected to the movable parts of the actuator, since rotation of the bushing 33 enables the relative position of the valve stem 12 to be adjusted with respect to the movable cylinder unit. The position of the sleeve 33 on the stem 12 also determines the extent of the downward travel of the cylinder unit, which terminates when the sleeve head 33b seats on the reduced portion 11b of the valve bonnet.

This adjustment is of double importance in that it insures the valve stem moving downward far enough to seat tightly the diaphragm of the valve 10 on its seat and yet not too far so as to exert an excessive force on the diaphragm which would, if exerted, cause the diaphragm to be damaged.

Fluid pressure is admitted to and released from the pressure chamber 26 through a hole 15'a extending along the axis of the column 15'. The lower end of this column is fastened to one of the projections 13a on the adapter collar 13, by a special fluid pressure intake stud 14'. This special stud is screwed into the lower end of the hollow column 15' where internal threads have been tapped in the hole 15'a to receive it. The body 14'a of the special stud, between its head and threaded end, is slightly reduced in diameter and through this narrowed section a hole 14'b is drilled perpendicular to the axis of the said special stud. A passageway 14'c is also drilled in this special stud along its axis from its threaded end deep enough to join the hole 14'b.

A suitable hole 13c is located in the projection 13a to which the hollow column 15' is secured. This hole is drilled perpendicular to the axis of the hole 13b and enters the latter adjacent to the reduced portion 14'a of the special stud 14'.

Fluid pressure first enters the improved device at the hole 13c through a suitable pipe connection 36. It then passes into the hole 13b and occupies the space surrounding the reduced portion 14'a of the special stud 14'. Because of the space thus created it is possible for the fluid pressure to enter the hole 14'b in the special stud, and thence enter the hole 14'c also in the special stud, whether or not the axis of the hole 14'b is in alignment with the hole 13c when the special stud is screwed into the hollow column 15'. From the hole 14'c in the special stud the fluid pressure enters the passageway 15'a in the column 15' and passes thence to the pressure chamber 26.

Suitable sealing washers 37 are interposed between the head of the special stud 14' and the projection 13a and between the lower end of the hollow column 15' and the projection 13a to prevent leakage of fluid pressure.

A compression spring 38 of sufficient strength to exert the force required of the actuator when no fluid pressure is being applied is interposed between the flanged bottom plate 30 of the movable cylinder unit and the lower ends of the bolts 20 of the fixed piston unit. The fluid pressure acting over the effective area of the movable cylinder unit exerts a force great enough to compress the said spring 38 and obtain the desired travel of the elements to be actuated in a direction opposite to the direction of the travel caused by the spring 38.

Thus the closing force exerted by the actuator is derived from the compression spring and the opening force is provided by the fluid pressure. Should the latter inadvertently fail the result would be that until a repair is made the valve would not be opened. In piping systems where valves are often operated by actuators it is frequently more desirable that a valve close or remain closed in the event of a fluid pressure failure, rather than open or continue open. This is an example of one of the uses to which my improved actuator may be put, illustrating the advantages to be derived from its principle of operation.

I claim:

A fluid pressure actuator for moving a valve element to and from its seat in a valve body; said actuator comprising a movable outer cylinder unit having a generally cylindrical side wall and closed at one end; a fixed inner piston unit concentrically arranged within said movable outer cylinder unit and adjacent to the said closed end thereof; a flexible sleeve diaphragm interposed in the space between the edge of the said fixed inner piston unit and the side wall of the said movable outer cylinder unit, the inner circular edge of said flexible sleeve diaphragm being secured to the fixed inner piston unit and the outer circular edge of the said flexible sleeve diaphragm being secured to the side wall of the said movable outer cylinder unit, the said flexible sleeve diaphragm and the units to which it is secured defining a pressure chamber; fixed supporting columns fastened at one end to the said fixed inner piston unit and adapted to be rigidly supported at the other end, one of the said supporting columns being hollow to provide a passageway; means connected with said passageway for introducing fluid pressure into the said pressure chamber to effect travel of the said movable outer cylinder unit in a direction to expand said pressure chamber, said passageway and said connecting means also serving to exhaust the pressure from the fluid pressure chamber; a bottom plate fastened to the other end of said movable outer cylinder unit having suitable holes to accommodate the said fixed supporting columns which pass through said bottom plate to the fixed inner piston unit adjacent the first mentioned end of the said movable outer cylinder unit; adjustable connecting means centrally located on the said bottom plate for movement with the said cylinder unit; compression spring means interposed between the said fixed inner piston unit and the said bottom plate for effecting travel of the movable elements in a direction to collapse said pressure chamber when no fluid pressure is applied to the pressure chamber.

References Cited in the file of this patent

UNITED STATES PATENTS

| Number | Name | Date |
|---|---|---|
| 1,991,663 | Delaney | Feb. 19, 1935 |
| 2,478,575 | Fitch | Aug. 9, 1949 |
| 2,536,000 | Bowditch | Dec. 26, 1950 |